United States Patent

Torrey

(10) Patent No.: US 9,639,671 B2
(45) Date of Patent: May 2, 2017

(54) SECURE EXECUTION OF ENCRYPTED PROGRAM INSTRUCTIONS

(71) Applicant: Assured Information Security, Inc., Rome, NY (US)

(72) Inventor: Jacob Torrey, Greenwood Village, CO (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 5 days.

(21) Appl. No.: 14/287,774

(22) Filed: May 27, 2014

(65) Prior Publication Data

US 2015/0347724 A1 Dec. 3, 2015

(51) Int. Cl.
 G06F 21/12 (2013.01)
 G06F 21/75 (2013.01)
 H04L 9/08 (2006.01)

(52) U.S. Cl.
 CPC .............. *G06F 21/12* (2013.01); *G06F 21/75* (2013.01); *H04L 9/0894* (2013.01)

(58) Field of Classification Search
 None
 See application file for complete search history.

(56) References Cited

U.S. PATENT DOCUMENTS

| 6,370,614 | B1* | 4/2002 | Teoman | G06F 12/0862 711/113 |
| 7,734,932 | B2* | 6/2010 | Buer | G06F 21/51 713/193 |
| 8,209,510 | B1* | 6/2012 | Thathapudi | G06F 12/145 711/163 |
| 8,473,754 | B2* | 6/2013 | Jones | G06F 21/53 380/277 |
| 8,886,959 | B2* | 11/2014 | Goto | G06F 21/52 380/28 |
| 2008/0148026 | A1* | 6/2008 | Dhodapkar | G06F 9/3806 712/228 |
| 2008/0235757 | A1* | 9/2008 | Li | G06F 9/45558 726/1 |
| 2009/0182981 | A1* | 7/2009 | Greiner | G06F 9/30029 712/204 |
| 2009/0293130 | A1* | 11/2009 | Henry | G06F 21/74 726/26 |

(Continued)

OTHER PUBLICATIONS

Zhuravlev et al., Encrypted Program Execution, Trust, Security and Privacy in Computing and Communications (TrustCom), 2014 IEEE 13th International Conference on, Sep. 24-26, 2014, pp. 817-822.*

(Continued)

*Primary Examiner* — Luu Pham
*Assistant Examiner* — Harvey Cohen
(74) *Attorney, Agent, or Firm* — Matthew M. Hulihan; Heslin Rothenberg Farley & Mesiti PC

(57) ABSTRACT

Provided are facilities for secure execution of an encrypted executable comprising an encrypted instruction. The secure execution includes obtaining the encrypted instruction, decrypting the encrypted instruction using a decryption key being maintained in a secure location within a processor, and storing the decrypted instruction to a secure storage for execution, where the decryption key remains in the secure location during the decrypting and the storing to facilitate maintaining security of the decryption key.

17 Claims, 6 Drawing Sheets

(56) References Cited

U.S. PATENT DOCUMENTS

| | | | | |
|---|---|---|---|---|
| 2010/0281223 A1* | 11/2010 | Wolfe | ............... | G06F 12/0808 |
| | | | | 711/133 |
| 2012/0159184 A1* | 6/2012 | Johnson | ............. | G06F 12/1466 |
| | | | | 713/189 |
| 2012/0260345 A1 | 10/2012 | Quinn et al. | | |
| 2013/0061058 A1* | 3/2013 | Boivie | .................. | G06F 21/74 |
| | | | | 713/189 |
| 2013/0254494 A1* | 9/2013 | Oxford | ............. | G06F 12/1466 |
| | | | | 711/145 |
| 2014/0230077 A1* | 8/2014 | Muff | .................. | G06F 9/45558 |
| | | | | 726/30 |

OTHER PUBLICATIONS

Brenner, et al., A smart-gentry based software system for secret program execution, Proceedings of the International Conference on Security and Cryptography, 2011, pp. 238-244.*

Brenner et al., Secret program execution in the cloud applying homomorphic encryption, 5th IEEE International Conference on Digital Ecosystems and Technologies (IEEE DEST 2011), 2011, pp. 114-119.*

Platte et al., A combined hardware and software architecture for secure computing, Apr. 2005, ACM CF '05: Proceedings of the 2nd conference on Computing frontiers.*

Fletcher et al., A secure processor architecture for encrypted computation on untrusted programs, Oct. 2012 STC '12: Proceedings of the seventh ACM workshop on Scalable trusted computing Publisher: ACM.*

Yumbul et al., Efficient, secure, and isolated execution of cryptographic algorithms on a cryptographic unit, Sep. 2009 SIN '09: Proceedings of the 2nd international conference on Security of information and networks Publisher: ACM.*

Dannynquist, "VERA—Visualizing Executables for Reversing and Analysis", Open Malware, submitted Dec. 19, 2010, pp. 1-3.

"Trusted Boot", Sourceforge.net, pp. 1-3.

Tilo Muller et al., "TRESOR Runs Encryption Securely Outside RAM", In Proceedings of the 20th USENIX Conference on Security (2011), pp. 17-17, https://www.usenix.org/legacy/events/sec11/tech/full_papers/Muller.pdf.

GitHub, "ainfosec/MacResponse-Forensics", https://github.com/ainfosec/MacResponse-Forensics.

Open Malware, "VERA—Visualizing Executables for Reversing and Analysis", http://www.offensivecomputing.net/?q=node/1687.

Intel Developer Zone, "Intel® Trusted Execution Technology", submitted by Suman A. Sehra, Jan. 13, 2014, https://software.intel.com/en-us/articles/intel-trusted-execution-technology.

Sourceforge, "Trusted Boot", http://sourceforge.net/projects/tboot/.

Intel, Intel® 64 and IA-32 Architectures Software Developer's Manual, vol. 3A, Chapters 11.3-11.11, pp. 2297-2324 (Feb. 2014), http://www.intel.com/content/dam/www/public/us/en/documents/manuals/64-ia-32-architectures-software-developer-manual-325462.pdf.

Eswaramoorthi Nallusamy, "A Framework for Using Processor Cache as RAM (CAR)", Oct. 10, 2005, http://www.coreboot.org/images/6/6c/LBCar.pdf.

MacResponse Forensics, http://macresponseforensics.com.

* cited by examiner

SECURE EXECUTION OF ENCRYPTED PROGRAM INSTRUCTIONS

BACKGROUND

Software makers often attempt to protect their proprietary algorithms from discovery and unauthorized duplication. Example technology used to this end involves obfuscating and/or packing the sensitive binary (executable) to make binary analysis challenging. Unfortunately, modern binary analysis and visualization tools, such as the "Visualizing Executables for Reversing and Analysis" tool (VERA, available at http://www.offensivecomputing.net/?q=node/1687), enable detection of packers and extraction of sensitive control-flow graphs to subvert these protections.

Another example technology employed by software makers involves encrypting the entire operating system and/or boot-loader of the system executing the proprietary algorithms to ensure that the system is in a trusted state for execution of the binary. The Trusted Boot (also known as tboot, offered at http://sourceforge.net/projects/tboot/) and Trusted Execution Technology (offered by Intel Corporation, Mountain View, Calif.) behave in this manner to create a trusted endpoint prior to executing the application. However, these solutions only protect an endpoint from non-volatile attacks. Once the system has booted, and even though initially secure, it can nevertheless be compromised during its execution such that the sensitive applications are extracted. In addition, hardware attacks, such as a cold-boot RAM attack, allow application duplication from even a trusted endpoint.

Existing technology fails to provide adequate protections that maintain the integrity of software while preventing malicious third parties from exploiting weaknesses in its implementation through, for instance, a key generator or other exploit.

BRIEF SUMMARY

Shortcomings of the prior art are overcome and additional advantages are provided through the provision of a method to facilitate secure execution of an executable comprising an encrypted instruction. The method includes obtaining, by a processor, an encrypted instruction; decrypting, by the processor, the encrypted instruction to obtain a decrypted instruction, the decrypting using a decryption key being maintained in a secure location within the processor; and storing, by the processor, the decrypted instruction to a secure storage for execution, wherein the decryption key remains in the secure location within the processor during the decrypting and the storing to facilitate maintaining security of the decryption key.

Further, a computer system is provided to facilitate secure execution of an executable comprising an encrypted instruction. The computer system includes a memory and a processor in communication with the memory, and the computer system is configured to perform: obtaining, by the processor, the encrypted instruction; decrypting, by the processor, the encrypted instruction to obtain a decrypted instruction, the decrypting using a decryption key being maintained in a secure location within the processor; and storing, by the processor, the decrypted instruction to a secure storage for execution, wherein the decryption key remains in the secure location within the processor during the decrypting and the storing to facilitate maintaining security of the decryption key.

Yet further, a computer program product is provided to facilitate secure execution of an executable comprising an encrypted instruction. The computer program product includes a non-transitory computer-readable storage medium having program instructions for execution by a processor to perform: obtaining, by the processor, the encrypted instruction; decrypting, by the processor, the encrypted instruction to obtain a decrypted instruction, the decrypting using a decryption key being maintained in a secure location within the processor; and storing, by the processor, the decrypted instruction to a secure storage for execution, wherein the decryption key remains in the secure location within the processor during the decrypting and the storing to facilitate maintaining security of the decryption key.

Additional features and advantages are realized through the concepts and aspects described herein. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
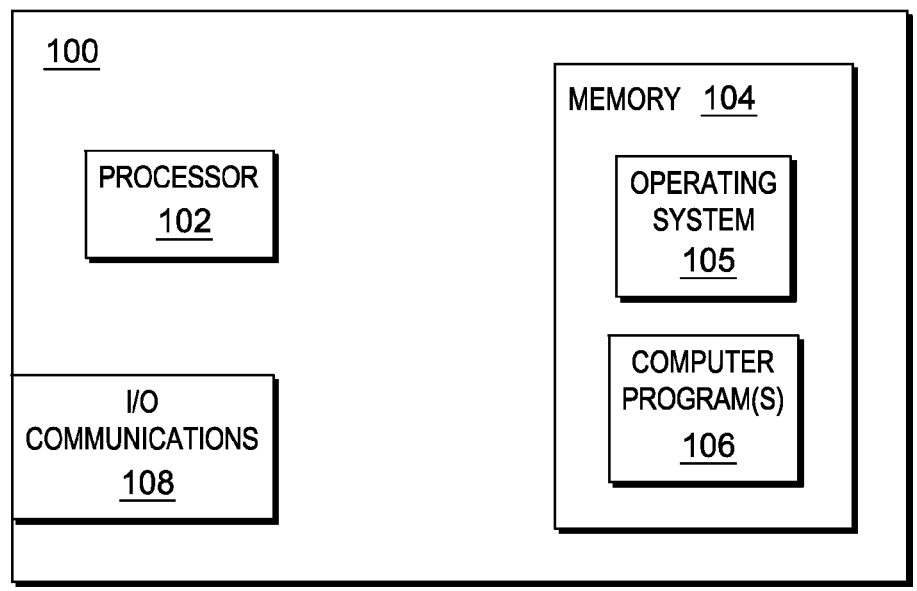
FIG. 1 depicts an example data processing system to incorporate and use aspects described herein.

Described herein are facilities to seamlessly and securely execute encrypted applications. Example encrypted applications include executables that are themselves fully encrypted (i.e., being treated as any arbitrary form of data to be encrypted), or executables having one or more portions, such as individual instructions, modules, routines, algorithms, etc., that are encrypted. Although any encryption/decryption scheme may be used, examples provided herein refer to the Advanced Encryption Standard (AES) specification. In some examples, an initially unencrypted executable is encrypted using an encryption key (which may be known or unknown), and at some later time is securely decrypted and executed according to aspects described herein. Unlike existing techniques that rely on complex obfuscation of the application, usually performed during compilation time, facilities described herein transparently provide secure decryption and execution of an executable. It can work with commercial/government off-the-shelf (COTS/GOTS) applications without prerequisite modification, and it is possible to run a fully encrypted application without requiring the key or the decrypted instructions to be stored in main memory.

As noted above, existing software security technology fails to provide an adequate way of protecting de-obfuscated application code and data. An obfuscated application that is practically impossible to reverse engineer can therefore be relatively easily subverted.

One existing approach to encrypting an application is to treat it as a regular encrypted data file to be later decrypted. In this case, the encrypted executable is handled as if it were any arbitrary form of encrypted data: the file is decrypted to obtain decrypted instructions, the decrypted instructions are stored to, for instance, main memory, and then the decrypted instructions are executed. In another known approach, the program source may be modified by a packer, for instance, that encrypts/obfuscates a portion of the program, which is then decrypted/de-obfuscated when the program is run. In this case, typically, an initial portion of the program has a decryption routine that decrypts other portions of the executable to memory and the majority of the software is decrypted as the executable runs.

In both of the above existing approaches, the starting point is an encrypted executable and the decrypted data is written to an unencrypted regular memory page. Consequently, a debugger or reverse engineer using state-of-the art tools could access the main memory storing the decrypted data and recover the algorithms, no matter how heavily obfuscated the encrypted version of the application is. And, although existing facilities such as an encrypted boot-loader and/or operating system, or other existing technologies such as tboot and Intel's Trusted Execution Technology (TXT) are capable of preventing an attacker from reading the binary from the disk at rest, or subverting the system at boot-time with pre-boot attacks, such defenses do not necessarily provide security against physical attacks or attacks initiated after a successful boot.

There has been a focus placed on security-through-obscurity, as discussed above, in attempting to ensure the security of the application and its sensitive algorithms, but this has repeatedly been shown to be sub-optimal. While program code may be obfuscated in an increasingly convoluted manner, the reversing community—a group that is known for incredible creativity and determination—continues to discover ways to access the decryption keys or decrypted program instructions after being stored to main memory.

The above scenarios fail to provide decryption and storage of the decrypted data to a secure storage, while protecting the decryption key. Aspects described herein address these and other deficiencies by providing security tools to prevent loss of expensive cyber assets and protect a software developer's intellectual property. An architecture-provided instruction set, such as the Advanced Encryption Standard Instruction Set (Intel® Advanced Encryption Standard New Instructions—AES-NI), which is an extension to the x86 instruction set architecture offered by Intel Corporation, may be used for on-CPU encryption and decryption. As described in further detail below, this use may be extended for use with encrypted executables, i.e. to execute encrypted applications. The AES-NI instruction set may provide AES decryption capabilities with the decryption key stored in a secure location, such as CPU register(s). The decryption key may be loaded into the register(s) at boot time to protect against an attacker searching memory for the decryption key or performing a cold RAM attack to acquire the decryption key. Encrypted instructions can be decrypted using the secure decryption key. In some embodiments, where the decrypted instructions are written to a component outside of the CPU executing the instructions, they may be written to a secure storage, for instance a permissions-protected memory page. In other embodiments, neither the decryption key nor any decrypted instruction resides in main memory. Further enhancements may provide ways to avoid maintaining the decrypted application instructions in main memory (e.g. RAM) during normal operation. They instead may be stored in only an on-CPU facility, such as a CPU cache, to seamlessly provide secure decryption on an as-needed basis without application rewrite. Thus, in some embodiments, transparent decryption and execution of a fully-encrypted existing COTS/GOTS application is provided while minimizing or avoiding leakage of the decryption key or sensitive decrypted instructions to main memory (or more generally outside of the CPU). This can help prevent some or all of the application's code or data from being accessible by, for instance, software memory acquisition tools, cold-boot RAM attacks, or debuggers, as examples. In some examples, a "thin"-hypervisor for an operating system, such as the Windows® 7 operating system (offered by Microsoft Corporation, Redmond, Wash.) running on an x86 instruction set architecture, is used to leverage capabilities described herein, though a hypervisor implementing Intel®'s AES-NI instruction set, is just one example; aspects described herein are applicable in many different processor architectures and privileged environments.

FIG. 1 depicts an example data processing system to incorporate and use aspects described herein. Data processing system 100 includes at least one processor 102 and memory 104 (also referred to as main memory or RAM). Processor 102 includes any appropriate hardware component(s) capable of executing program instructions. An example type of processor is a central processing unit (CPU). Memory 104 includes an operating system 105 and one or more computer programs 106 to provide aspects described herein, such as a hypervisor and other facilitates to provide secure execution of an encrypted executable. Additionally, memory 104 can include guest machines and/or virtual environments and facilities thereof (not pictured) from which an encrypted executable may be loaded for secure execution thereof in accordance with aspects described herein.

Data processing system 100 further includes input/output (I/O) communications interface component 108 for communicating data between data processing system 100 and external devices, such as I/O and peripheral devices (mouse, keyboard, display devices) and network devices. In some embodiments, data processing system 100 includes a universal serial bus (USB) or peripheral component interconnect (PCI) device, in which case I/O communications interface component 108 comprises, respectively, a USB or PCI adapter configured to couple to a USB or PCI port of the computing platform.

Data processing system 100 may include fewer components than illustrated, additional components not illustrated herein, or some combination of the components illustrated and additional components. Data processing system 100 may be any type of computing device known in the art, such as a mainframe, server, personal computer, workstation, laptop, handheld computer, telephony device, network appliance, virtualization device, storage controller, etc.

Figure 2:
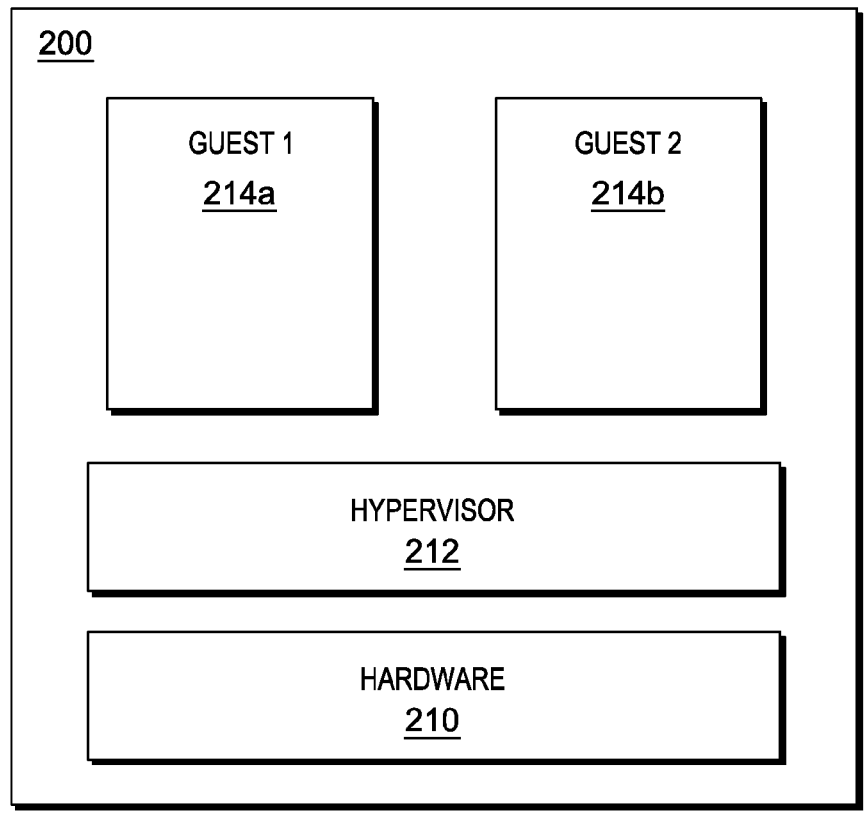
FIG. 2 depicts a further example of a data processing system to incorporate and use aspects described herein.

As noted previously, a data processing system may leverage a hypervisor to accomplish aspects discussed herein. FIG. 2 depicts an example of such a data processing system. In FIG. 2, data processing system 200 is shown having hardware 210 which includes the hardware resources of the system, such as processor(s), main memory, I/O devices, etc. A hypervisor 212 sits (conceptually) above hardware 210 in that the hypervisor 212 virtualizes the underlying hardware resources to provide virtualized environment(s) for guests. In some embodiments, hypervisor 212 uses hardware-assisted virtualization available through extensions supported by the processor(s). These extensions are termed "processor extensions" or "VM extensions". Intel Corporation's VT-x and Advanced Micro Devices' AMD-V® are well-known examples of VM extensions through which hypervisor 212 may be provided (AMD-V is a trademark of Advanced Micro Devices, Inc., Sunnyvale, Calif.). In this example, hypervisor 212 'hosts' two guest systems 214a and 214b, which may be virtual machines executing one or more operating systems and other computer programs.

In addition to the virtualization of resources, and in accordance with a first embodiment, hypervisor 212 may be configured to control, by way of hardware capabilities in one example, such as virtual machine extension technology, access permissions for data in main memory of hardware 210. Hypervisor 212 may be a thin-hypervisor and not control hardware or memory. An existing hypervisor (such as the Xen® hypervisor offered by Citrix Systems, Inc., Santa Clara, Calif., U.S.A. may be modified to support operating system-independent capabilities for on-CPU AES decryption. The hypervisor may provide protections on access to storage (e.g. memory pages) containing decrypted data. Such protections can include protecting against unauthorized access by software executing on the system to backing pages of main memory storing the decrypted data. For instance, the decrypted instructions can be stored to memory pages marked with execute-only permissions.

CPU register(s), such as debug register(s), may be loaded with a decryption key. The key may be loaded early in the boot-process to boot the system, and the hypervisor's privileges may be used to prevent kernel and user-space applications from accessing the register(s). Debug registers are typically used only by software debugging suites, which can revert to software breakpoints if the registers are unavailable. Thus, the debug registers are good candidates for a secure location to store the decryption key.

Once the key is loaded and the system is booted, an AES operation is used to decrypt and execute an encrypted instruction loaded into the CPU. The AES-NI instruction set (in this example) may be leveraged to decrypt the encrypted instruction without the decryption key leaving the CPU, i.e. maintaining the decryption key in the secure location of the debug register(s), as an example. As noted above, the AES-NI is a separate instruction set enhancement that provides hardware AES capabilities (encryption/decryption). AES-NI, or any other such instruction set enhancement, is not a requirement however. These capabilities could be emulated in software, for instance, but the resulting performance degradation may be undesirable in such a case.

Thus, in one embodiment, secure execution of an encrypted executable is facilitated through hypervisor-provided memory page protections, in accordance with aspects described herein. This embodiment is described and depicted with reference to FIG. 3. With the AES decryption key protected, the encrypted instructions may be decrypted and stored to a region in main memory having permissions set to execute-only.

Figure 3:
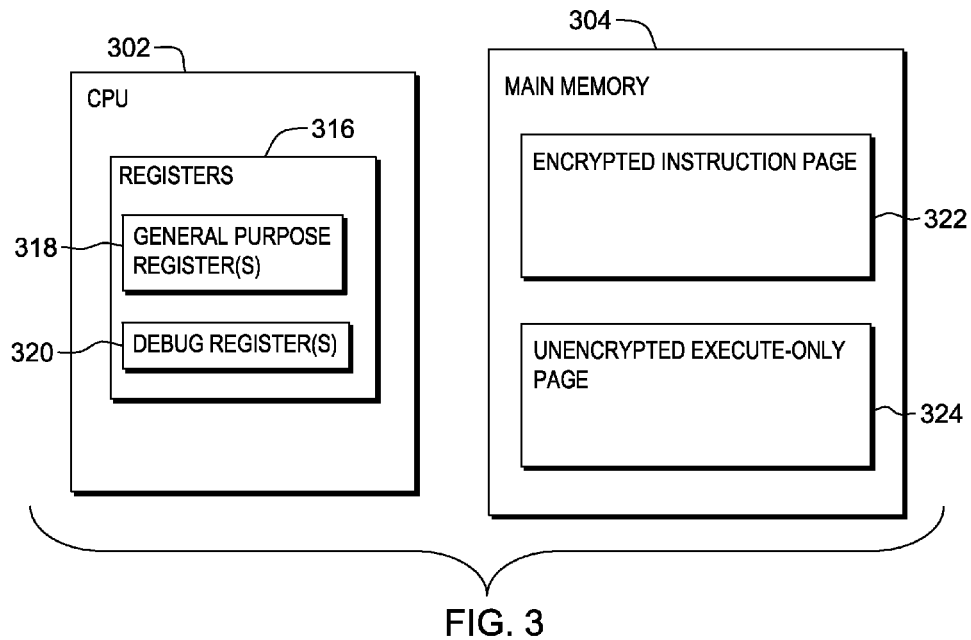
FIG. 3 depicts an example in which secure execution of an encrypted executable is facilitated through hypervisor-provided memory page protections, in accordance with aspects described herein.

Referring to FIG. 3, CPU 302 includes registers 316, which include general purpose registers 318 and debug register(s) 320. One or more debug registers 320 may be loaded with a decryption key. This loading may be performed in a secure manner, such as during a boot process to boot the system only after the system has been verified as secure.

In operation, main memory 304 may include an instruction page 322 having encrypted instruction(s). The entire contents of instruction page 322 may be encrypted, or only some portions thereof may be encrypted. In any case, CPU 302 may read some or all of page 322 into CPU memory (such as a cache, not pictured). The AES-NI (or similar) processor capabilities are leveraged to decrypt, using the decryption key stored in the debug register(s), some or all of the encrypted portion(s) of the cached instruction page 322. The decrypted portions are then stored to an unencrypted memory page 324. Access permissions on memory page 324 may be set to execute-only. In some examples, this is done by the hypervisor taking advantage of memory management features provided by address translation facilities of the hardware architecture. In most recent implementations of virtual machine extensions, a hypervisor can assume a role in the memory management and isolation of each guest system, which includes management of backing page permissions. Intel Corporation's EPT and Advanced Micro Devices' RVI technology, for instance, provide another layer of paging structures, beyond those maintained by a memory manager of an operating system executing in a virtual machine. Since page 324 is marked execute only, attempts by a malicious entity (running in user-mode, or even kernel-mode software) to read the page and extract decrypted data may fail.

In the above embodiment, the instructions are decrypted to main memory, providing a sufficient level of security in many scenarios. The above approach lays a framework for additional embodiments that extend the hypervisor with what is termed herein Virtualization-Assisted Cache-Only Memory (VACOM). In additional embodiments, VACOM attempts to avoid storage of sensitive decrypted data to main memory (e.g. a regular backing page or an unencrypted execute-only page, as above) for any significant amount of time or at all. It does so by using on-CPU cache(s), which in today's modern processors are large enough to support the approaches discussed herein. A decrypted instruction may be placed in, and executed directly from, the CPU cache, rather than being stored to main memory and separately loaded into the CPU for execution. Instead, in accordance with aspects of additional embodiments described herein, the instructions are prevented from residing at all, or for a significant portion of time, in RAM, making otherwise viable attacks to access the decrypted instructions significantly more challenging or impossible. By decrypting an encrypted instruction and executing it without maintaining it in main memory, more sophisticated attacks such as cold-boot RAM attacks or accesses from a malicious SMM handler are made prohibitively difficult, if not impossible.

Figure 4:
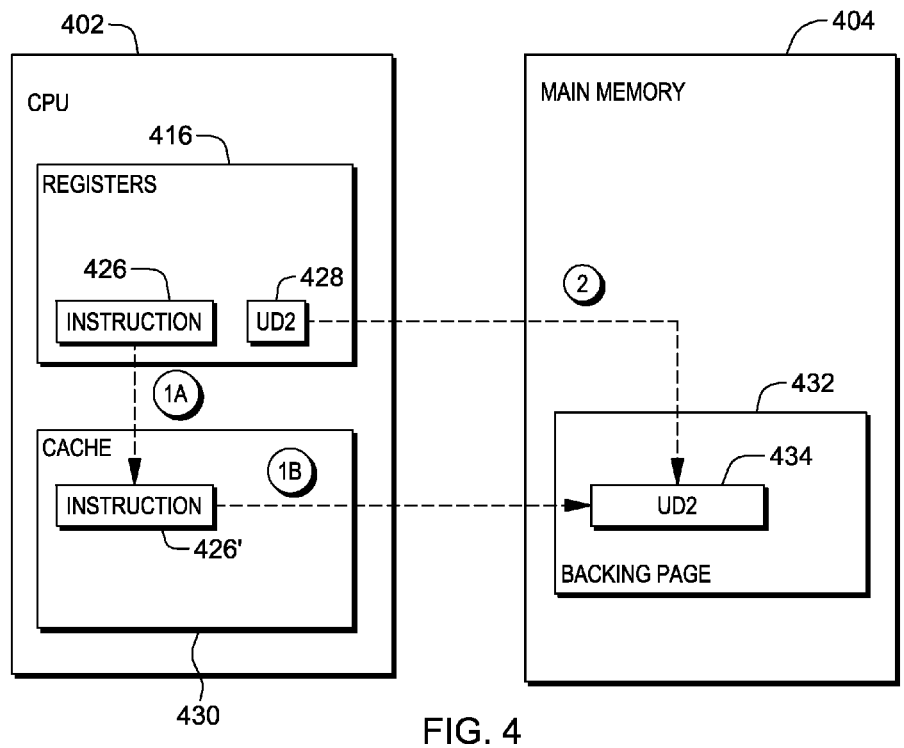
FIG. 4 depicts one example of a virtualization-assisted cache-only memory technique for secure execution of an encrypted executable, in accordance with aspects described herein.

FIG. 4 depicts one embodiment of a virtualization-assisted cache-only memory technique for secure execution of an encrypted executable, in accordance with aspects described herein. In this embodiment, a double-write through technique is employed to overwrite an unencrypted instruction stored to main memory.

Referring to FIG. 4, CPU 402 includes registers 416 and cache 430. Stored in a first register (or registers) is an encrypted instruction 426. The encrypted instruction is decrypted (using a decryption key securely stored on the CPU in, e.g., a debug register) to obtain a decrypted instruction, i.e. the instruction in an unencrypted state. This is stored (see 1A in FIG. 4) in cache 430 as decrypted instruction 426'. A backing page of main memory for this portion of cache 430 may be configured with a caching type of write-through, in which CPU writes are made both to the cache and to the backing page in main memory 432. The caching type used for a page of memory is known as the "memory type" in the Intel® architecture. There are various ways of configuring the memory type to be used for a page of memory. For instance, the page directory or page table entry corresponding to that page may indicate the memory type to be used for that data. Additionally or alternatively, flags in the memory type range registers (MTRRs) may be used to control the caching types for regions of memory. In one example, the hypervisor uses the architecture-provided memory type flags in MTRRs to set the page as write-through cacheable, which will cause the CPU to direct memory writes to both the cache and the main memory. In this mode, valid reads are drawn directly from the cache. When a caching type is configured as write-through, the cache (or at least the portion that caches the backing page) is referred to as a write-through cache.

Thus, based on storing a decrypted instruction 426' to cache 430, the decrypted instruction 426' is also written (see 1B in FIG. 4) to backing page 432 of main memory 404 as instruction 434. In accordance with aspects of this embodiment, when the AES decryption routine decrypts a block of memory (e.g. 32-bit encrypted instruction of the application) and puts it in the write-though cache, it will immediately follow that decryption instruction with a nontemporal move instruction that will directly overwrite (see 2 in FIG. 4) that memory location (434) of the backing page with a faulting instruction, with the 'move' bypassing the cache. The faulting instruction to be written can be maintained in a second register (or registers) as faulting instruction 428. The faulting instruction may be configured to cause a fault based on an attempted execution of the faulting instruction. Here, the faulting instruction is one having a UD2 operation code (opcode) which is an undefined opcode in the Intel® architecture. Attempted execution of an instruction having this opcode causes an invalid operation code fault.

In this embodiment, the decrypted instruction resides in memory for a very short amount of time—the amount of time taken to complete the single operation to overwrite the decrypted instruction with the UD2 instruction (in this example). This "double-write" will leave cache 430 primed with the decrypted instruction (426'), while the backing location in main memory instead holds a faulting instruction (UD2 instruction) of no interest to a malicious attacker.

These faulting instructions are recognized by the hypervisor as an indication that the cache line is no longer valid. Supposing that the cached version of the decrypted instruction has been evicted from the cache and replaced by something else, the backing page of memory will be accessed to fetch the instruction for execution. Instead, the UD2 instruction that overwrote the decrypted instruction in main memory is pulled into the cache. When the processor attempts to execute the UD2 instruction, a fault to the hypervisor is driven. The hypervisor recognizes invalid faults coming from the attempted execution of an instruction of that page of memory. However, the hypervisor is aware that the faults result from the double-write from above. The hypervisor can therefore initiate a repeat of the decryption process for that instruction, i.e. repeat the decryption of the instruction to the write-through cache, and overwrite, with the faulting instruction, of the copy of the decrypted instruction in main memory. Execution may be resumed at that point with the decrypted instruction now residing in the CPU cache and its copy in main memory having been overwritten with the garbage faulting instruction.

In the above process, the decrypted instruction is stored to main memory, outside of the CPU, only as long as it takes to overwrite the decrypted instruction with a faulting UD2 instruction. Aside from residing for that brief period in main memory, no decrypted instruction resides outside of the physical CPU. Further enhancements to embodiments described herein may include randomization of decryption addresses, and/or adding fake instruction writes to complicate instruction regeneration.

In yet another embodiment providing VACOM capabilities described herein, secure execution of an encrypted executable is facilitated through a no-write-back technique. This technique removes the risk of data leakage from main memory because storage of decrypted data outside of the CPU is avoided altogether. In this technique, the caching type for the backing page of memory is set to write-back, which is a mode of caching widely available on many processors. Write-back is a caching method in which updates to the data in the backing page of memory (based on updates to the cached copy of the data) are postponed. This is in contrast to the write-through method above in which coherency is more or less constantly maintained between the cache and main memory.

In write-back, the CPU initially interacts only with the cache. Memory reads (from main memory) fill the cache, if needed, and writes go only to the cached copy of the data, and not the backing page, until a synchronizing event occurs, such as a LOCK, WBINVD (Write Back and Invalidate cache) instruction, or an interrupt request, as examples. In accordance with an embodiment described herein, the hypervisor may be configured to prevent synchronization that would otherwise occur upon a synchronization event while the target encrypted application is scheduled to run on the processor. For instance, upon a context switch to a next application or the kernel, or otherwise prior to a synchronization event occurring, the hypervisor can issue an Invalidate Internal Caches (INVD) instruction, for instance, to invalidate the cache before writing the contents, and therefore the updates, i.e. decrypted instructions, back to main memory.

In conjunction with this approach, a no-fill cache operating mode may optionally be enabled for the cache. In this mode, a write to the cache updates the cache without updating the backing page of memory (only writes to shared lines and write misses update system memory). This may be enabled by way of the CPU's control register, for instance by setting bits thereof to enable the no-fill cache mode. In the Intel® architecture, this is accomplished by setting the CD bit of Control Register 0 (CR0) to 1 and the "Not-write through" (NW) bit of CR0 to 0.

Figure 5:
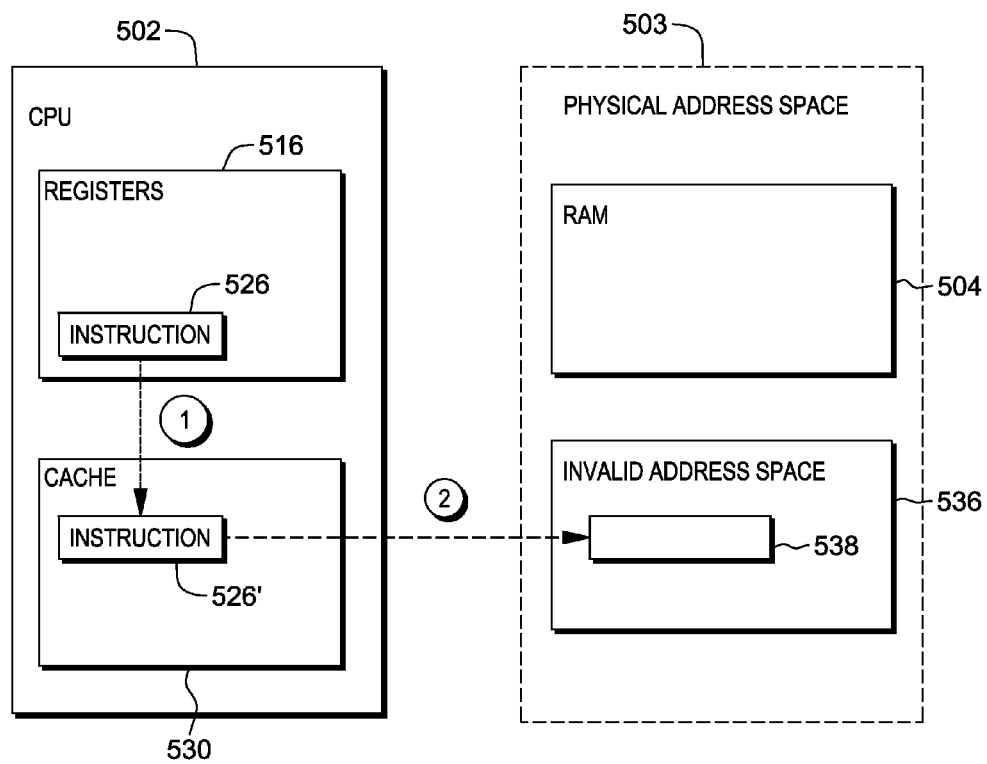
FIG. 5 depicts another example of a virtualization-assisted cache-only memory technique for secure execution of an encrypted executable, in accordance with aspects described herein.

Yet another embodiment is provided herein to prevent decrypted instructions from being stored outside of the CPU. This is described and depicted with reference to FIG. 5. The hypervisor can re-map the backing page of memory (using EPT, for instance,) over a region for which a bus error or other fault is driven upon attempted storage of a decrypted instruction thereto. An example such region is a region of the system's physical address space that is not backed by physical RAM, or an I/O region. Memory remapping may be performed by modifying the page tables used by the memory management unit (MMU) present on the chipset to point "virtual addresses" (used by the application) to "physical addresses" (used by the hardware). This process can be logically extended using the EPT method by mapping from "guest physical addresses" (used by the virtual machine guest OS) to "machine physical addresses" (used by the hardware), to drive an error upon an attempt to store the decrypted instruction to the machine physical address space.

Referring to FIG. 5, CPU 502 again includes registers 516, one or more of which includes an encrypted instruction 526. The instruction is decrypted to a CPU cache 530 as decrypted instruction 526' (see 1 in FIG. 5). Using EPT permissions, the backing page of memory (a page of RAM 504 within physical address space 503) is remapped to an invalid address space 536. When the CPU attempts to write decrypted instruction 526' to an invalid address (portion 538 of invalid address space 536—see 2 in FIG. 5), an error will occur and the write to space 538 will be aborted. More specifically, the write would generate a bus error, which could be intercepted by the hypervisor and disregarded. The CPU cache is left primed with the decrypted instruction but the decrypted instruction is not stored to main memory.

Management of the AES key(s) to be stored in the CPU during runtime of the system may leverage known technologies that match encrypted applications to Trusted Platform Module identifiers or other system identifiers to minimize duplication of keys. Known methods for securely loading the key into the CPU may also be leveraged. Existing trusted computing technologies (such as hardware/software dynamic root of trust measurement) may provide a known-to-be secure operating environment for at least the few instructions to load a key into the CPU and start a secure hypervisor. An example such trusted computing technology is described in commonly-assigned U.S. patent application Ser. No. 13/435,015 to Quinn et al. (U.S. Patent Application Publication No. US 2012/0260345 A1), entitled TRUST VERIFICATION OF A COMPUTING PLATFORM USING A PERIPHERAL DEVICE, filed Mar. 30, 2012, which is hereby incorporated herein by reference in its entirety. Reliance on such trusted computing does not assume that the system will remain secure and uncompromised during its entire lifecycle. Instead, when the few instructions to bootstrap the CPU key storage remain unexploited, aspects described herein facilitate secure execution of an encrypted executable regardless of the system becoming compromised after its initial trusted state.

Figure 6:
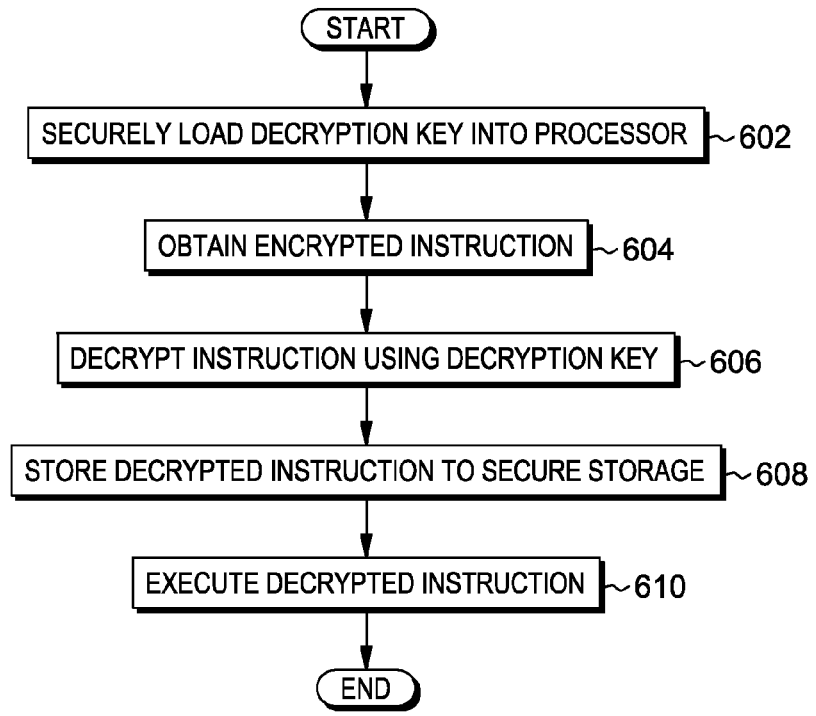
FIG. 6 depicts an example process to facilitate secure execution of an executable comprising an encrypted instruction, in accordance with aspects described herein.

Accordingly, FIG. 6 depicts one example of a process to facilitate secure execution of an executable comprising an encrypted instruction, in accordance with aspects described herein. In some examples, the executable is itself encrypted (and therefore instructions thereof are encrypted), while in other examples only portions of the executable, such as portions containing one or more instructions, are encrypted. The process of FIG. 6 may be performed by a processor of a data processing system, which may be operating according to machine instructions or other code (i.e. software, such as firmware, microcode, etc.) that the processor executes.

The process of FIG. 6 begins by securely loading a decryption key into the processor (602). The key is loaded securely to facilitate avoiding leakage of the decryption key to an untrusted source. In some examples, the key is loaded from a trusted source across a path that has been established to be trustworthy. In some examples, the decryption key is loaded and maintained in a secure location within the processor. The secure location within the processor may include one or more registers of the processor, where the decryption key is loaded into the one or more registers of the processor at boot time and maintained therein for use by the processor in decrypting an instruction.

Next, an encrypted instruction is obtained (604) by the processor. The processor decrypts the encrypted instruction using the decryption key (606). The result is a decrypted instruction which is then stored to a secure storage (608) for execution. In some examples, the decryption key remains in the secure location within the processor during the decrypting and the storing, to facilitate maintaining security of the decryption key. Additionally or alternatively, the decrypting and the storing may be performed absent the decryption key being stored in main memory—that is, without the decryption key being written to main memory by, e.g., the processor. More generally, the decrypting and the storing may be performed absent storing the decryption key outside of the processor. In this scenario, the key remains only on the CPU die and, optionally, in/on the original source of the key, for instance a Trusted Platform Module (TPM) storage or other trusted secure module from which the key was loaded onto the processor. The decryption key may be absent from main memory.

In some embodiments, the secure storage to which the decrypted instruction is stored is a page of main memory. The memory page may have permissions set to execute-only, in which reads and writes to the page by software are disabled.

Continuing with FIG. 6, the processor, based on decrypting the encrypted instruction, then executes the decrypted instruction (610). The decrypted instruction may be maintained in the secure location until it is executed, and may optionally be maintained therein after it is executed (for instance in case the instruction is executed as part of a loop or commonly-executed routine). It may be desirable to overwrite or otherwise flush the decrypted instruction from the secure location at some later time, to prevent an attack from later obtaining the decrypted instruction. In typical scenarios, the executable will be an encrypted executable having multiple encrypted instructions. In these cases, the obtaining, decrypting, and executing of these multiple encrypted instructions is performed, to transparently execute the encrypted executable.

Figure 7:
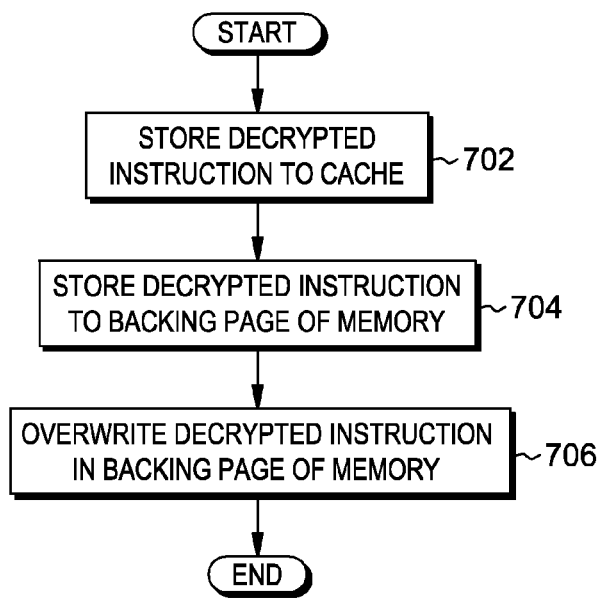
FIG. 7 depicts an example process for storing a decrypted instruction to a secure storage, in accordance with aspects described herein.

FIG. 7 depicts an example process for storing a decrypted instruction to a secure storage (see 608), in accordance with aspects described herein. The process of FIG. 7 may be performed by a processor of a data processing system, which may be operating according to software that the processor executes. In this example, the secure storage includes a cache of the processor. The portion of the cache to which the decrypted instruction is stored is backed by a backing page of main memory. A memory type of the backing page may be set to write-through. The process begins by storing the decrypted instruction to the cache (702). By the configuration of the cache as a write-through cache, the decrypted instructions are also stored to the backing page of main memory (704). Based on the decryption and storage of the decrypted instruction to the backing page of memory, the processor then executes an instruction to overwrite the decrypted instruction stored in the backing page of main memory (706).

Executing the instruction to overwrite the decrypted instruction may overwrite the decrypted instruction in the backing page of main memory with a faulting instruction. The faulting instruction is configured to cause a fault based on an attempted execution of the faulting instruction. The attempted execution of the faulting instruction will, for instance, drive an invalid operation code fault. Thus, a processor may recognize that that the decrypted instruction has been evicted from the cache and, in response, and in an attempt to pull the evicted data back into the cache, load from the backing page of main memory the faulting instruction configured to cause the fault. This may be advantageous in that, based on attempting to execute the loaded faulting instruction, the fault may be recognized by an entity (such as the hypervisor, for instance), which may then initiate, based on recognizing the fault, repeating of the obtaining the encrypted instruction, decrypting the encrypted instruction to obtain a decrypted instruction, and storing the decrypted instruction to the secure storage. This re-primes the cache with the decrypted instruction. The decrypted instruction may again be written to the backing page of memory (due to the write-through configuration of the cache) and again be overwritten with another faulting instruction. Execution may be resumed with the decrypted instruction now residing in the cache.

Figure 8A:
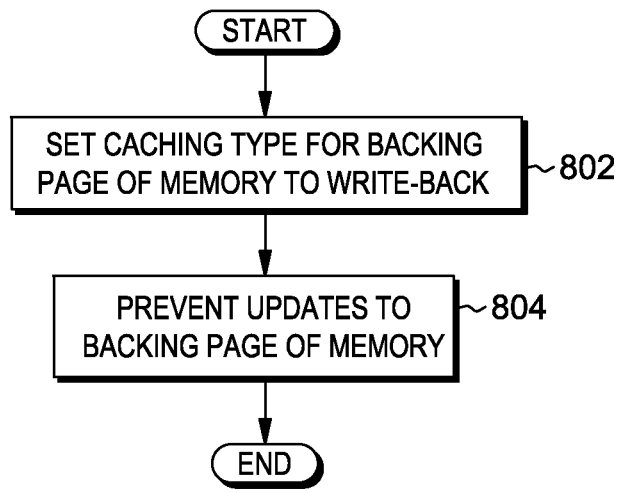
FIG. 8A depicts an example process for storing a decrypted instruction to a secure storage, in which updates to a backing page of main memory are prevented from occurring, in accordance with aspects described herein.

In some examples, a decrypted instruction is stored to a secure storage and updates to a backing page of main memory are prevented from occurring, in accordance with aspects described herein. FIG. 8A depicts an example such process. In this example too, the secure storage includes a cache of the processor. The portion of the cache to which the decrypted instruction is stored is backed by a backing page of main memory and a memory type of the backing page of memory for the portion of the cache to which the decrypted instruction is stored may be set to write-back. The process of FIG. 8A may be performed by a processor of a data processing system, which may be operating according to software that the processor executes.

The process begins by setting a caching type for the backing page of main memory to write-back (802). Under this caching type, updates to the backing page of main memory based on updates to the cache are postponed. Thus, based on a synchronization event in which postponed update(s) to the backing page of main memory are to be written, the method further includes preventing the updates to the backing page of main memory from occurring (804). This prevention may be active while the encrypted executable is scheduled on the processor to execute. In some examples, upon a context switch to de-schedule the encrypted executable from execution on the processor, the decrypted instruction in the cache may be invalided (by the hypervisor, for instance) absent the decrypted instruction being written to the backing page of main memory. For instance, the invalidation may be performed prior to the synchronization of the updated cache data to the backing page of memory.

Figure 8B:
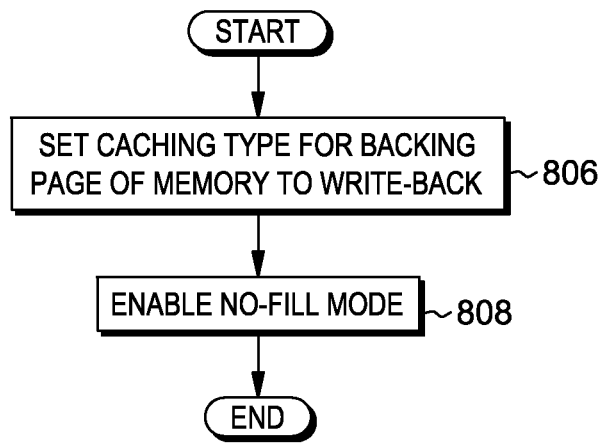
FIG. 8B depicts an example process for storing a decrypted instruction to a secure storage, in which a no-fill cache operating mode is enabled for the cache, in accordance with aspects described herein.

In further examples, a decrypted instruction is stored to a secure storage and a no-fill cache operating mode is enabled for the cache, in accordance with aspects described herein. FIG. 8B depicts an example such process. Here also, the secure storage includes a cache of the processor and the portion of the cache to which the decrypted instruction is stored is backed by a backing page of main memory having a caching type set to write-back. The process of FIG. 8B may be performed by a processor of a data processing system, which may be operating according to software that the processor executes.

As in the example of FIG. 8A, the process of FIG. 8B begins by setting a caching type for the backing page of main memory to write-back (806). The process then enables a no-fill cache operating mode for the cache (808). In the no-fill mode, a write to the cache will update the cache without updating the backing page of main memory.

Described herein are facilities for secure execution of encrypted instructions included in executables. Such facilities work with COTS/GOTS applications and provide enhanced security compared to existing technologies.

Those having ordinary skill in the art will recognize that aspects of the present invention may be embodied in one or more systems, one or more methods and/or one or more computer program products. In some embodiments, aspects of the present invention may be embodied entirely in hardware, entirely in software, or in a combination of software and hardware aspects that may all generally be referred to herein as a "system" and include circuit(s) and/or module(s).

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by, or in connection with, an instruction execution system, apparatus, or device, such as a processor. The program code stored in/on the computer readable medium therefore produces an article of manufacture (such as a "computer program product") including program code. The computer readable medium may be a non-transitory computer readable storage medium, which comprises all storage media with the sole exception being a transitory, propagating signal.

Figure 9:
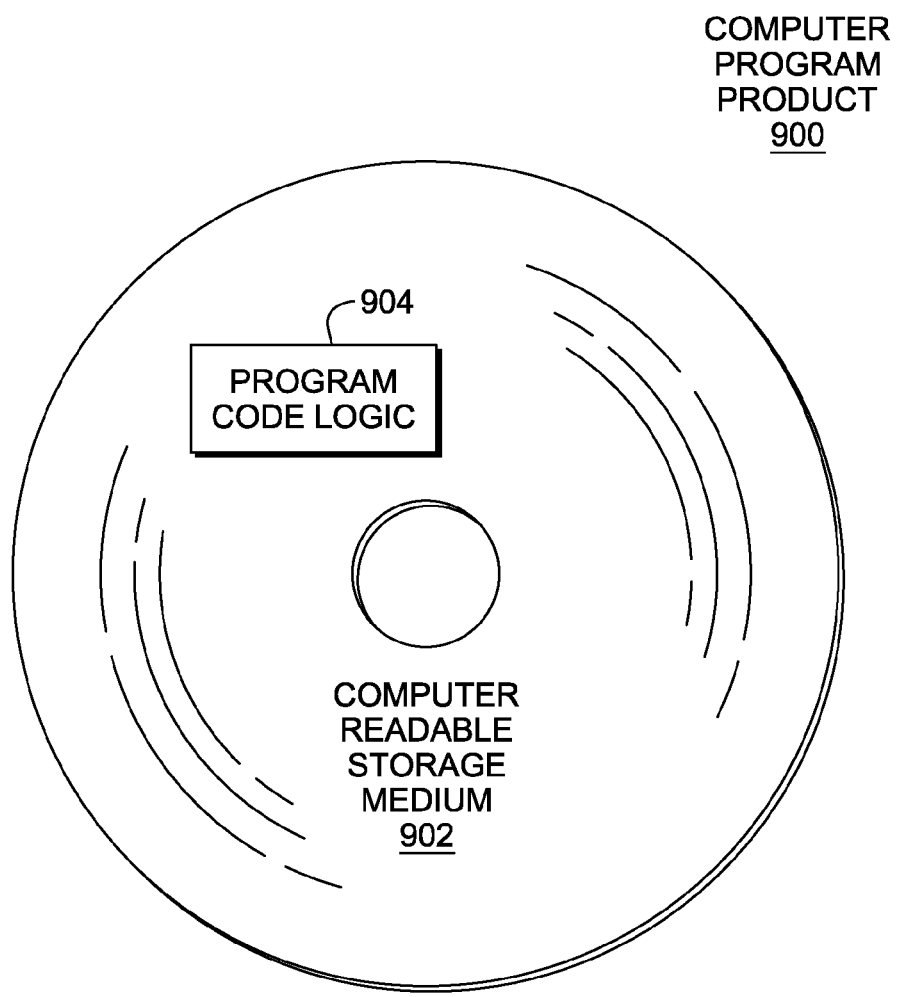
FIG. 9 depicts one example of a computer program product to incorporate and use aspects described herein.

Referring now to FIG. 9, in one example, a computer program product 900 includes, for instance, one or more computer readable media 902 to store computer readable program code means or logic 904 thereon to provide and facilitate one or more aspects of the present invention.

Program code contained or stored in/on a computer readable medium can be obtained and executed by a data processing system (computer, computer system, etc. including a component thereof) and/or other devices to cause the data processing system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained or stored for execution by one or more processors. Computer program instructions may be provided to one or more processors of, e.g., one or more data processing system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to facilitate secure execution of an executable comprising an encrypted instruction, the method comprising:
   obtaining, by a processor, the encrypted instruction;
   decrypting, by the processor, the encrypted instruction to obtain a decrypted instruction, the decrypting using a decryption key being maintained in a secure location within the processor;
   storing, by the processor, the decrypted instruction to a secure storage for execution, the secure storage comprising a cache of the processor and the secure storage having execute-only permissions applied thereto based on permissions of a backing page of main memory, the backing page of memory being a backing page of main memory for the portion of the cache, the backing page of main memory including a caching type of write-through, wherein storing the decrypted instruction to the secure storage comprises storing the decrypted instruction to a portion of the cache and to the backing page of main memory, and the decryption key remaining in the secure location within the processor during the decrypting and the storing to facilitate maintaining security of the decryption key; and
   executing, by the processor, based on decrypting the encrypted instruction and storing the decrypted instruction to the backing page of memory, an instruction to overwrite the decrypted instruction stored in the backing page of main memory, wherein the executing the instruction by the processor to overwrite the decrypted instruction overwrites the decrypted instruction in the backing page of main memory with a faulting instruction configured to cause a fault based on an attempted execution of the faulting instruction.

2. The method of claim 1, wherein the decrypting and the storing are performed absent the decryption key being stored in main memory.

3. The method of claim 1, further comprising securely loading the decryption key into the processor to facilitate avoiding leakage of the decryption key to an untrusted source.

4. The method of claim 3, wherein the decryption key is loaded into one or more registers of the processor at boot time and maintained therein for use by the processor in decrypting the encrypted instruction.

5. The method of claim 1, wherein the secure storage comprises the backing page of main memory having permissions set to execute-only, wherein reads and writes to the backing page of main memory by user-mode and kernel-mode software are disabled.

6. The method of claim 1, further comprising the processor, based on decrypting the encrypted instruction, executing the decrypted instruction.

7. The method of claim 1, wherein the attempted execution of the faulting instruction causes an invalid operation code fault.

8. The method of claim 1, wherein the method further comprises:
  recognizing that the decrypted instruction has been evicted from the cache;
  loading from the backing page of main memory the faulting instruction configured to cause a fault;
  based on attempting to execute the loaded faulting instruction, recognizing a fault; and
  initiating, based on recognizing the fault, repeating of the obtaining the encrypted instruction, decrypting the encrypted instruction to obtain a decrypted instruction, and
  storing the decrypted instruction to the secure storage.

9. The method of claim 1, wherein the method further comprises setting a caching type for the backing page of main memory to write-back, in which updates to the backing page of main memory based on updates to the cache are postponed.

10. The method of claim 9, further comprising, based on a synchronization event in which postponed updates to the backing page of main memory are to be written, preventing the updates to the backing page of main memory from occurring.

11. The method of claim 10, wherein the executable comprises an encrypted executable, and wherein based on a context switch to de-schedule the encrypted executable from executing on the processor, a hypervisor invalidates the decrypted instruction in the cache.

12. The method of claim 9, further comprising enabling a no-fill cache operating mode for the cache, in which a write to the cache updates the cache absent updating the backing page of main memory.

13. The method of claim 1, wherein the decrypting and the storing are performed absent storing the decryption key outside of the processor.

14. The method of claim 1, wherein the executable comprises an encrypted executable having multiple encrypted instructions, wherein the encrypted executable is transparently executed, in which the multiple encrypted instructions are decrypted and executed.

15. A computer system to facilitate secure execution of an executable comprising an encrypted instruction, the computer system comprising:
  a memory; and
  a processor in communication with the memory, wherein the computer system is configured to perform:
    obtaining the encrypted instruction;
    decrypting the encrypted instruction to obtain a decrypted instruction, the decrypting using a decryption key being maintained in a secure location within the processor;
    storing the decrypted instruction to a secure storage for execution, the secure storage comprising a cache of the processor and the secure storage having execute-only permissions applied thereto based on permissions of a backing page of main memory, wherein the backing page of memory is a backing page of main memory for the portion of the cache, wherein the backing page of main memory is configured to have a caching type of write-through, wherein storing the decrypted instruction to the secure storage comprises storing the decrypted instruction to a portion of the cache and to the backing page of main memory, and wherein the decryption key remains in the secure location within the processor during the decrypting and the storing to facilitate maintaining security of the decryption key; and
    based on decrypting the encrypted instruction and storing the decrypted instruction to the backing page of memory, the processor executing an instruction to overwrite the decrypted instruction stored in the backing page of main memory, wherein executing the instruction to overwrite the decrypted instruction overwrites the decrypted instruction in the backing page of main memory with a faulting instruction configured to cause a fault based on an attempted execution of the faulting instruction.

16. A computer program product to facilitate secure execution of an executable comprising an encrypted instruction, the computer program product comprising:
  a non-transitory computer-readable storage medium comprising program instructions for execution by a processor to perform:
    obtaining the encrypted instruction;
    decrypting the encrypted instruction to obtain a decrypted instruction, the decrypting using a decryption key being maintained in a secure location within the processor;
    storing the decrypted instruction to a secure storage for execution, the secure storage comprising a cache of the processor and the secure storage having execute-only permissions applied thereto based on permissions of a backing page of main memory, wherein the backing page of memory is a backing page of main memory for the portion of the cache, wherein the backing page of main memory is configured to have a caching type of write-through, wherein storing the decrypted instruction to the secure storage comprises storing the decrypted instruction to a portion of the cache and to the backing page of main memory, and wherein the decryption key remains in the secure location within the processor during the decrypting and the storing to facilitate maintaining security of the decryption key; and
    based on decrypting the encrypted instruction and storing the decrypted instruction to the backing page of memory, the processor executing an instruction to overwrite the decrypted instruction stored in the backing page of main memory, wherein executing the instruction to overwrite the decrypted instruction overwrites the decrypted instruction in the backing page of main memory with a faulting instruction configured to cause a fault based on an attempted execution of the faulting instruction.

17. The method of claim 1, wherein the processor performing the obtaining, the decrypting, and the storing conforms to an x86 instruction set architecture.

* * * * *